United States Patent Office

3,427,263
Patented Feb. 11, 1969

---

3,427,263
PROCESS FOR THE MANUFACTURE OF
POLYURETHANE FOAMS
Henricus Gerardus Josef Overmars, Zeist, Netherlands,
  assignor to Koninklijke Industrieele Maatschappij
  Noury & van der Lande N.V., Deventer, Netherlands,
  a corporation of the Netherlands
No Drawing. Filed May 27, 1965, Ser. No. 459,457
Claims priority, application Netherlands, June 9, 1964,
  6406534
U.S. Cl. 260—2.5          2 Claims
Int. Cl. C08g 22/04, 53/10

ABSTRACT OF THE DISCLOSURE

Polyurethane foams having a high degree of thermal stability are made by reacting one or more polyhydroxy compounds with one or more polyfunctional isocyanates in the presence of a blowing agent and a catalyst for the gelation reaction consisting of a di-organotin compound of the formula

wherein R represents a hydrocarbon radical and X represents a halogenated aliphatic carboxylic acid radical containing at least one halogen atom.

---

This invention relates to a process for the manufacture of polyurethane foams.

Polyurethane foam has previously been obtained by reacting polyfunctional isocyanates with polyhydroxy compounds, such as polyesters and/or polyethers, under the influence of a gelation catalyst. The formation of foam is effected with physical and/or chemical blowing agents. Physical blowing agents used are Freons, lower hydrocarbons and esters. Carbonic acid, formed by the reaction of water and a small portion of the polyfunctional isocyanate, is a chemical blowing agent. The reaction of the chemical blowing agent is usually catalyzed, for instance by a tertiary amine, such as triethylene diamine or triethylamine. In the preparation of polyurethane foams use is made of organometallic compounds such as dialkyl-tin-compounds of the formula (Alkyl)$_2$SnX$_2$ e.g. dibutyltin laurate. Other substances are also frequently added, such as stabilizers, substances for reducing the combustibility and/or the inflammability, filling agents, pigments, colouring agents, silicone oil and the like.

Such foams have a low thermal stability. They are subject to slow decomposition, which causes deterioration in the mechanical properties of the foam. The thermal decomposition can be investigated by an accelerated ageing test, for instance by heating the foam in air at a high temperature. Some foams decompose completely after a few hours of heating. Some foams, when heated, remain more or less intact but it has been found, by subjecting them to an extraction test, that serious decomposition has taken place during heating. This extraction is effected, for instance, with methylethylketone and the extract is evaporated and the residue weighed. As compared with foam which has not aged, the weight of the residue, i.e. in low-molecular reaction products, is then considerably larger. If an ordinary polyurethane foam, in which a conventional organotin compound has been used as gelation catalyst, is heated for instance for 6 hours in air at a temperature of 160° C. and is subsequently extracted with methylethylketone, it is found that the residue of the extract amounts to 15–20% of the weight before heating. Without the ageing process, the residue is of the order of from 2 to 3%. Stabilizers such as catechol, butylcatechol and tartaric acid have been used to avoid ageing but considerable drawbacks have been experienced. Tartaric acid causes a retardation of the foam reaction when a chemical blowing agent is used and a coarse and bad foam structure results. Catechols have a moderate effect or they give rise to undesirable smells and discolorations. Another drawback is that these stabilizers readily exude or evaporate.

It has now been found that gelation catalysts of the general formula:

in which R represents a substituted or unsubstituted alkyl or cycloalkyl group and both X groups are halogenated carboxylic acid radicals—in contrast to compounds in which X contains no halogen—reduce the ageing of the foam to a considerable extent.

According to the present invention a process of manufacturing a polyurethane foam comprises reacting one or more polyhydroxy compounds with one or more polyfunctional isocyanates in the presence of a physical and/or chemical blowing agent and a catalyst for the gelation reaction consisting of a di-organo-tin compound of the general formula:

in which R represents a substituted or unsubstituted alkyl or cycloalkyl group and both of the X groups are halogenated carboxylic acid radicals.

The invention also concerns polyurethane foams and articles comprising such polyurethane foams when manufactured by the process according to the invention.

The polyhydroxy compounds are advantageously polyesters and/or polyethers, the polyethers, preferably being polyoxypropylene glycol and/or polyoxypropylene triolether. The physical blowing agent is preferably a Freon, a lower hydrocarbon or an ester and the chemical blowing agent may be carbonic acid formed in the mixture by the action of water on the isocyanate, this action advantageously being catalysed by a tertiary amine, such as triethylene diamine or triethylamine.

The mixture also preferably includes stabilizers, combustibility reducers, inflammability reducers, filling agents, pigments, colouring agents and/or silicone oil. The stabilizers may be catechol, butylcatechol or tartaric acid.

The following test indicates the usefulness of the gelation catalyst used according to the invention in reducing the gelation time for foam.

5 grams of a branched polyether (polyoxypropyleneglycol with a KOH number of 55 and a molecular weight of about 3000) were mixed with 50 mg. of the catalyst to be tested. After this, 0.4 cc. of toluenediisocyanate (80% of 2-4-derivative and 20% of 2-6-derivative) were thoroughly admixed. Both mixing stages were effected at 20° C. The time which elapsed until the final gelation of the mixture was measured in minutes.

A control experiment without the gelation catalyst resulted in a gelation time of over 600 minutes, which, naturally, is too long to be admissible in practice. Practical times are of the order of up to 60 minutes.

The gelation times in minutes of some of the catalysts according to this invention are as follows:

Dibutyl-tin-bis(chloro-acetate) _____ 46
Dibutyl-tin-bis(dichloro-acetate) _____ 41
Dibutyl-tin-bis(trichloro-acetate) _____ 24
Dibutyl-tin-bis(betachloro-propionate) _____ 45
Diethyl-tin-bis(betachloro-propionate) _____ 47
Dioctyl-tin-bis(betachloro-propionate) _____ 46
Dibutyl-tin-bis(gammachloro-butyrate) _____ 29
Dibutyl-tin-bis(omegabromo-undecylate) _____ 36

Similar results are obtained when other polyhydroxy compounds, other mixing ratios or another isocyanate are employed. Therefore, the effect is in no way dependent on the testing method used.

EXAMPLE 100 grams of a polyoxypropylene triolether (KOH number 56.9 and molecular weight 3000) were mixed with 1.5% by weight of silicone oil and 0.2% by weight of dioctyl-tin-bis(betachloro-propionate). After some time 3.2 cc. of water, in which 5% by weight of triethylenediamine had been dissolved, were added. After that, 36 cc. of toluenediisocyanate (80% of 2-4- and 20% of 2-6-derivative) were added during vigorous stirring. After another 10 seconds the mixture was poured into a paper cylinder, after which the mixture foamed. The result was a polyurethane foam having a very regular foam structure and an apparent specific weight of 0.05.

In an analogous way foams were made with a number of other catalysts according to the invention.

The extraction experiment with methylethylketone before and after six hours of heating at 160° C. yielded the following results.

| Catalyst | Residue of the extract in percent | |
|---|---|---|
| | Before heating | After heating |
| Dibutyl-tin-dilaurate | 1.8 | 14.5 |
| Dibutyl-tin-bis(chloro-acetate) | 2.2 | 8.9 |
| Dibutyl-tin-bis(dichloro-acetate) | 2.7 | 4.6 |
| Dibutyl-tin-bis(betachloro-propionate) | 1.7 | 4.5 |
| Diethyl-tin-bis(betachloro-propionate) | 1.9 | 3.7 |
| Dioctyl-tin-bis(betachloro-propionate) | 1.5 | 6.6 |
| Dibutyl-tin-bis(omegabromo-undecylate) | 1.5 | 3.1 |
| Dibutyl-tin-bis(p-chloro-benzoate) | 1.1 | 11.7 |
| Dibutyl-tin(laurate) (omegabromo-undecylate) | 1.5 | 9.0 |

It is clear that the catalysts having halogenated acid radicals yield a foam, which is of a considerably greater thermostability than if unhalogenated acid radicals had been present.

By far the strongest effect is achieved when both X groups are halogenated carboxylic acid radicals.

It has been found that mixtures of semi-organic tin salts (such as tin dioctoate) in combination with the above-mentioned compounds are good stabilizers. It is also possible to use mixtures of the above-mentioned compounds.

Besides toluene diisocyanate, other aliphatic or aromatic polyfunctional isocyanates, such as polymethylene polyphenylisocyanate, diphenyl methanediisocyanate and mixtures of known isocyanates are also very useful in the present process. The same holds good for the polyhydroxy compounds, although, for reasons unconnected with the catalyst system, polyethers are to be preferred.

It is also possible in this case, to adapt all the auxiliary substances known in the conventional formation of polyurethane foam and the physical conditions, such as temperature and concentration of the reactants, to the processing techniques and/or the foam properties desired.

Another advantage of the catalysts used according to this invention is that they generally dissolve readily in the polyhydroxy compounds commonly used in the manufacture of polyurethane foam, the polyethers being particularly important.

The formation of foam may be effected in a mould for instance with the aid of known foaming machines. It is also possible to give the foam the desired shape by sawing or milling, or the formation can be effected on a carrier or between plates or foil (for instance paper) to obtain laminates.

While a specific example of preferred method embodying the present invention has been described above, it will be apparent that many changes and modifications may be made in the details of the methods of procedure without departing from the true spirit of the invention. It will therefore be understood that the particular method set forth above is intended to be illustrative only, and is not intended to limit the scope of the invention which is defined by the following claims.

What is claimed is:

1. A process of manufacturing polyurethane foams having a high thermostability comprising reacting one or more polyhydroxy compounds with one or more polyfunctional isocyanates in the presence of a blowing agent and a catalyst for the gelation reaction consisting of a di-organotin compound of the formula

in which R represents a hydrocarbon radical and X represents a halogenated aliphatic carboxylic acid radical containing at least one halogen atom.

2. A process according to claim 1, wherein the catalyst for the gelation reaction is a compound selected from the group consisting of:
dibutyl-tin-bis(chloro-acetate),
dibutyl-tin-bis(dichloro-acetate),
dibutyl-tin-bis(trichloro-acetate),
dibutyl-tin-bis(betachloro-propionate),
diethyl-tin-bis(betachloro-propionate),
dioctyl-tin-bis(betachloro-propionate),
dibutyl-tin-bis(gammachloro-butyrate), and
dibutyl-tin-bis(omegabromo-undecylate).

References Cited

UNITED STATES PATENTS

| 3,084,177 | 4/1963 | Hostettler et al. | 260—2.5 XR |
| 3,164,557 | 1/1965 | Merten et al. | 260—2.5 |
| 3,194,770 | 7/1965 | Hostettler | 260—2.5 XR |

DONALD E. CZAJA, *Primary Examiner.*

M. J. WELSH, *Assistant Examiner.*

U.S. Cl. X.R.

260—75, 77.5